Nov. 13, 1962 G. F. ROGERS 3,064,206
OSCILLATION GENERATOR AND MIXER
Filed Jan. 27, 1960
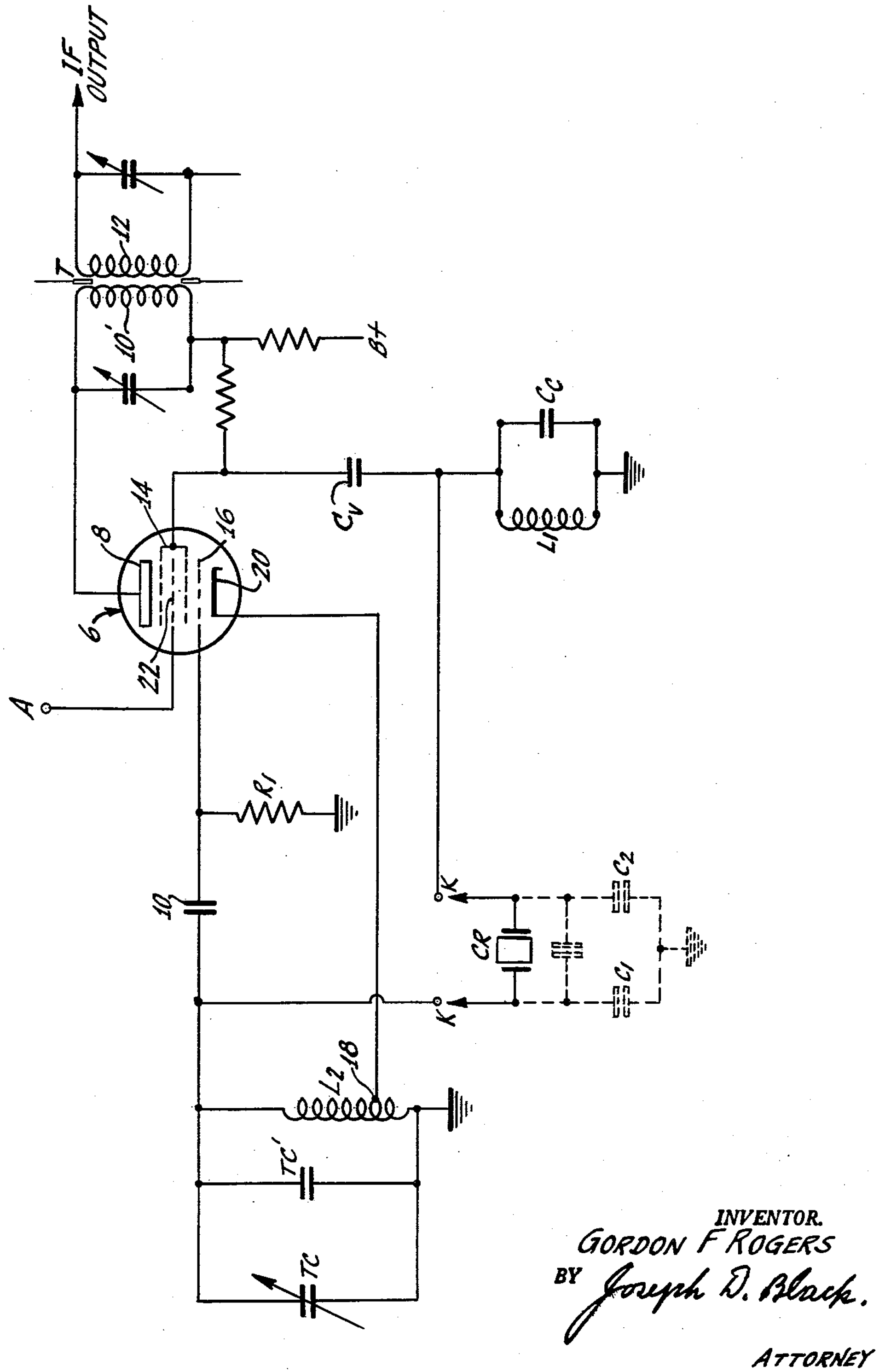
INVENTOR.
GORDON F ROGERS
BY Joseph D. Black.
ATTORNEY 3,064,206
OSCILLATION GENERATOR AND MIXER
Gordon F. Rogers, Moorestown, N.J., assignor to Radio Corporation of America, a corporation of Delaware
Filed Jan. 27, 1960, Ser. No. 4,964
3 Claims. (Cl. 331—164)

In this application I disclose a new and improved oscillation generator and mixer which may be put to use in the radio and allied arts.

An object of my invention is to provide an oscillation generator which is tunable over a specified range and may be operated at one of several fixed and constant frequencies within said range as determined by, say for example, a piezo-electric crystal.

Another object of my invention is provision of an oscillation generator as specified in the preceding paragraph which is simple in operation and requires minimum circuit alteration to change from a tunable condition of oscillation generation to a condition of stable and fixed single frequency oscillation generation at a selected frequency within the tunable range.

A further object of my invention is to provide an oscillation generator as specified in the two preceding paragraphs wherein, with a selected crystal in circuit, oscillation generation is inhibited at frequencies other than the desired frequency as determined by the crystal frequency. Thus, a crystal operating at a harmonic may be used without generation of oscillations at the fundamental frequency or at any frequency other than at the harmonic.

An additional object of my invention is provision of an oscillation generator as described above which may be tunable over a predetermined range of frequencies and, at a minimum additional cost, may be adapted to generate oscillations at one or more selected fixed frequencies.

The utility of my invention will be apparent to those versed in the art. An application I presently have in mind for the oscillation generator of the present invention is use thereof as the converter oscillator in a citizen's band receiver which is to be tunable over a frequency band of 23 channels as assigned by the FCC. Each channel is 10 kc. wide and in general adjacent channels are separated by 10 kc.

In industrial applications of receivers and transmitters of this type it is often desirable to operate at one of several selected fixed frequencies. My novel arrangement enables such use at a minimum increase in apparatus and cost.

These receivers, when operating with my improved oscillation generator, will have double appeal to the purchaser and/or user because then they may be operated as citizen's radios and also put to industrial use wherein the receiver is to be receptive only to other transmitters in the system being put to industrial use. In the detailed description which follows, such uses will be described, but it will be understood that my invention is not to be limited to such uses.

In describing details of my new and improved oscillation generator, reference will be made to the drawings wherein the single FIGURE illustrates a preferred embodiment of my invention.

In the embodiment illustrated, an electron discharge tube or device 6 has an anode 8 coupled to a tuned output circuit 10′ the inductance of which forms the primary winding of a doubly tuned transformer T having a tuned secondary winding 12 supplying, for example, intermediate frequency output for amplification and detection. The electron discharge tube 6 also has a screen grid 14 coupled by a voltage blocking condenser $C_V$ to ground through a parallel circuit, including inductance $L_1$ and capacitance $C_C$. Tube 6 also has a control grid 16 which is coupled by a grid condenser 10 to a parallel tuned circuit, including tuning condenser TC and a supplemental fixed tuning condenser TC′, both in parallel with an inductance $L_2$. Inductance $L_2$ is connected to ground as shown and a point 18 thereon is connected to the cathode 20 of the tube 6. Bias for the control grid 16 is supplied by the current in a resistor R1. The cathode 20 is the common electrode for the circuit in which the tube or device 6 is connected in a common cathode circuit. A crystal CR in a holder is arranged to be plugged into the circuit at contacts K. In an alternate embodiment, there may be several crystals with a two pole switch to connect a selected crystal in the circuit where the crystal CR shown is connected. When so plugged in, one side of the crystal is connected to the parallel tuned circuit TC–TC′–$L_2$ between $L_2$ and grid condenser 10, which elements are not removed from the circuit. The other side of the crystal is connected to the junction point between $C_V$ and $L_1C_C$.

As stated above, the device as illustrated may be the frequency converter system of a superheterodyne receiver supplied with incoming radio frequency signals at terminal A which is connected to the third grid 22. Intermediate frequency output energy may be taken from the converter output 12 which is coupled to the oscillation generator electrodes substantially only by the electron stream of the tube.

There may be one or more crystals each in a holder with pins extending through and insulated from the metal holder shell. The crystal pins facilitate plugging of the crystal into the circuit after selection. The holder is usually grounded to the chassis used for the apparatus and has been so shown in the drawings. There is inherent capacity between the pins and between the pins and the holder. These capacity effects are shown dotted in the drawings. The capacity between the pins and between the pin connected to the screen grid are of minor effect in the operation as will appear hereinafter. The capacity effect between the pins has been disregarded in the following description of the operation of my improved oscillation generator and mixer.

The crystal pins are arranged to be plugged into contacts, such as jacks, represented at K in the drawings.

When the crystal CR is not plugged in, the circuit operates in a conventional manner with the network $L_1C_C$ in the screen grid to ground path having a minor effect. $C_V$ and $L_1C_C$ now serve as a low impedance path, at the frequencies generated, between the screen grid 14 and ground. Then the screen grid 14 acts as the anode in the regenerative oscillation generator, including also the cathode 20 and the control grid 16. "Ground" as used here means a reference potential and may be the chassis used to support the apparatus. The screen grid 14 may be considered as being grounded through $C_V$–$L_1C_C$ for alternating currents of the frequency generated. As stated above, $L_1C_C$ during this operation is of small capacitive reactance at any of the oscillation frequencies generated herein by adjustment of the tuning condenser TC. The cathode is tapped up on the inductance $L_2$ and the regenerative oscillation generator is of the Hartley type. The grid 16 to ground impedance is essentially resistive at the frequency of oscillation. Operation now is assumed to be in the citizen's band radio, i.e., in the range of about 26.9 to 27.3 megacycles.

With the crystal CR plugged in, the circuit operates as a modified Pierce oscillator. Now the grid 16 circuit to ground reactance is capactive due to the addition of $C_1$, and the screen to ground reactance is also capacitive at the crystal frequency. Because of the small size of $C_2$ relative to the capacitive reactance in the screen grid to ground circuit, $C_2$ may be disregarded. For purposes of explanation, assume the crystal CR is not plugged in and assume also that the tuning capacitor TC is set for minimum capacity. The grid circuit then looks inductive for the crystal CR frequency which is then higher than the frequency of the tuned circuit. However, with the crystal plugged in, the capacity, represented by dotted lines at $C_1$, between the crystal pins, used for contact purpose, and the metal holder for the crystal, the latter being at ground potential, which may be the chassis potential, is sufficient to tune the grid circuit TC–TC′–$L_2$ below the lowest crystal frequency which might be selected for use in the band of frequencies involved. Thus, the grid circuit looks capacitive for any crystal frequency in the band at any setting of the variable tuning capacitor TC. Again, as stated above, the screen grid circuit with the crystal plugged in also looks capacitive.

In case the crystal CR is of a type which operates at the third overtone, the value of $L_1$ and corresponding value of $C_C$ is chosen as described above with a small capacitive reactance at the third overtone frequency to be of minor effect when the crystal is not in the circuit and also to present a net inductive reactance at the fundamental mode of the crystal, thus preventing oscillation except at the third overtone. This places the parallel resonant frequency of $L_1C_C$ between the fundamental and third overtone frequencies. The net capacitive reactance at the oscillation frequency determines the excitation rate. Under these circumstances, the crystal CR would have a fundamental mode of approximately a frequency $f/3$ where $f$ is the frequency of the oscillations used in the converter.

In an embodiment found satisfactory, elements as follows were used:

6 is a RCA type 6BE6 tube.
TC is variable from 2.8 to 5.1 mmfd
TC′ is approximately 66 mmfd
10 is approximately 22 mfd
$C_V$ is approximately 100 mfd
$R_1$ is approximately 47,000 ohms
$C_C$ is approximately 22 mfd
$L_1$ is approximately 10 $\mu$henry
$C_1$ and $C_2$ are of the order of 3 mmf

What is claimed is:

1. An oscillation generator to be controlled to operate at a selected fixed crystal frequency or at a variable frequency, including an electron discharge device having a control grid, a cathode, and an electrode serving as an anode, a tunable circuit including inductance coupled between said control grid and said electrode serving as an anode and to said cathode to provide a regenerative oscillation generator, a point on said tunable circuit being maintained at a reference potential, a crystal in a holder maintained substantially at said point of reference potential, said crystal having electrodes, said holder having pins insulated from the holder and connected to said electrodes, and connections for connecting said pins to said tunable circuit and to said electrode serving as an anode, the inherent capacity of said crystal pins being added to the reactance of said tunable circuit to insure oscillation generation by said electron discharge device when a crystal is included in said oscillation generator circuit at a frequency which is a multiple of the crystal frequency, and means in the coupling between said tunable circuit and said electrode serving as an anode for inhibiting generation of oscillations at other frequencies.

2. An oscillator having tunable means and being capable of operation at a predetermined fixed frequency irrespective of the setting of said tunable means; said oscillator comprising an electron discharge device having an anode, a cathode, a screen grid, a third grid, and a control grid; said third grid being available for application of incoming radio frequency signals; means including a blocking capacitor and a parallel circuit including an inductance and a capacitance for connecting said screen grid to a point of reference potential; a second parallel tuned circuit including a tuning capacitor connected in parallel with an inductance having a tap intermediate its ends; a connection from said tap to said cathode; a connection including a coupling capacitance for connecting one end of said tapped inductance to said control grid; a connection from the remaining end of said tapped inductance to said point of reference potential; a crystal in a holder; a pair of contacts for said crystal carried by said holder and insulated therefrom; a second pair of contacts; one contact of said second pair of contacts being connected to said end of said tapped inductance opposite said end thereof connected to said point of reference potential; the other of said second pair of contacts being connected between said blocking capacitor and said first named parallel circuit; and the inherent capacitance between one of said crystal contacts and said holder with said crystal contacts connected to said pair of contacts providing a connection to said point of reference potential whereby said oscillator generates oscillations at said crystal frequency irrespective of the adjustment of said second parallel tuned circuit.

3. In an oscillation generator arranged to be tuned over a predetermined frequency range, and to operate at a selected crystal frequency within said range, an electron discharge device having a common electrode, a control electrode and an output electrode coupled in a regenerative oscillation generator circuit of the Hartley type, including a tunable circuit comprising reactance and a connection from a point on said reactance to said common electrode, a connection from said reactance to a point of reference potential, means coupling said output electrode to said point of reference potential, said last named means including a parallel resonant circuit resonant at a frequency whereby said resonant circuit presents a low impedance during operation as an oscillation generator of the Hartley type, a crystal in a holder which crystal may be selected to control the frequency of operation of said generator, said holder being maintained substantially at said reference potential, connecting pins for said crystal extending from said holder and insulated therefrom, a contact in said tunable circuit opposite said end of said reactance connected to said point of reference potential into which one of said pins may be inserted, a second contact connected to said parallel resonant circuit adjacent said connection of said coupling means to said output electrode into which the other of said pins may be inserted, the inherent reactance between one of said crystal pins and said holder being sufficient when added to the reactance of said tunable circuit in conjunction with said parallel resonant circuit to cause said oscillation generator to operate as a modified Pierce oscillator to generate oscillatory energy at the frequency of the selected crystal irrespective of the adjustment of the said tunable circuit.

References Cited in the file of this patent

UNITED STATES PATENTS

| | | |
|---|---|---|
| 2,031,767 | Gebhard | Feb. 25, 1936 |
| 2,051,936 | Braaten | Aug. 25, 1936 |
| 2,141,750 | Herold | Dec. 27, 1938 |
| 2,506,762 | Antalek | May 9, 1950 |

FOREIGN PATENTS

| | | |
|---|---|---|
| 836,134 | France | Jan. 11, 1939 |

OTHER REFERENCES

Seely: Radio Electronics, 1956, pp. 300–301.